April 20, 1943. E. SWEDMAN 2,317,231

SELF-EMBEDDING NAIL HEAD

Original Filed Sept. 3, 1936

Inventor
ENOCH SWEDMAN

By Howard Pincher
Attorney

Patented Apr. 20, 1943

2,317,231

UNITED STATES PATENT OFFICE 2,317,231

SELF-EMBEDDING NAILHEAD

Enoch Swedman, St. Paul, Minn., assignor to Seeger Refrigerator Company, St. Paul, Minn., a corporation of Minnesota Original application September 3, 1936, Serial No. 99,315, now Patent No. 2,259,186, dated October 14, 1941. Divided and this application September 26, 1941, Serial No. 412,477

1 Claim. (Cl. 85—28)

This invention relates to means for securing molding in refrigerator door openings, wherein the head of the securing means may be embedded in the molding so that when the molding is fixed in position to cover the unfinished edges of the inner and outer sheathing of the refrigerator, the securing means for the molding will not be visible. This application is a division of my application Serial No. 99,315, filed September 3, 1936, for "Method of application of refrigerator molding with concealed securing nails" (issued as Patent No. 2,259,186, October 14, 1941).

A feature resides in providing a nail-like member or a nail-like screw member which is formed with a concave disc head-like portion which is adapted to fit into a recess in the molding; and when the molding is struck a blow on the outside of the recess portion of the same, the concaved head of the nail screw is caused to become flat, thereby expanding the annular periphery of the nail, causing the same to bite into the recess formed in the molding which receives the nail screw head. Thus the head is anchored in the recess and to the molding.

It is a feature to provide a nonmetallic molding in which a recess is formed and to provide a nail screw with a head portion which can be expanded into the recess to lock the nail and molding together, the nail screw being anchored in the body of the refrigerator or article to which the molding is adapted to be attached, so as to secure the molding thereto and prevent the same from becoming loose from the nail screw.

It is also a feature to provide a self-embedding nail which includes a dished disc head portion and a pointed screw-like nail shank portion extending therefrom, the head portion embedding itself in a member to be attached to an article when the head is flattened out in the course of attaching the article and the screw-like nail shank securing the article firmly in place.

These features together with other details and objects will be more fully and clearly hereinafter set forth.

In the drawing forming a part of my specification:

Figure 2 illustrates the form of nail screw with a thin dished head which is adapted to be inserted in a recess on the inside of a molding or the like.

Figure 3 is a section showing the dished head of the nail flattened out and anchored in the inside of the head receiving recess in the molding.

Figure 1:
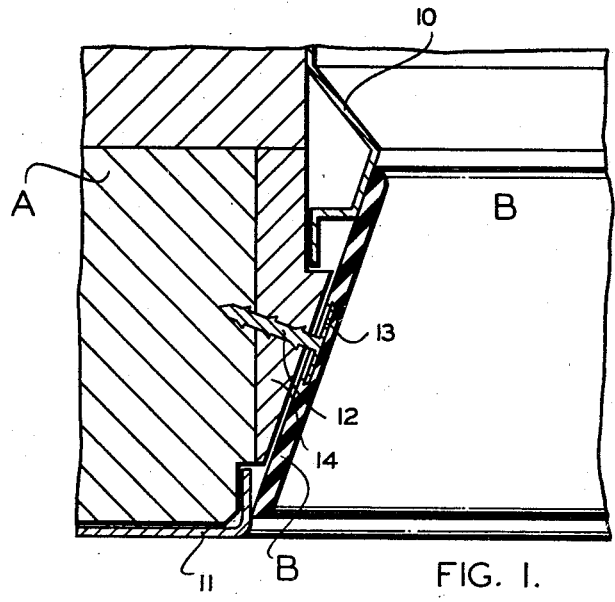
Figure 1 is a section of a door opening of a refrigerator showing the nonmetallic molding with the concealing screw nails secured to the inside of the same and the shank thereof embedded in the body of the refrigerator.

In a refrigerator or cabinet such as A, only a portion of which is shown in the drawing, where it is desirable to provide a finishing molding B to cover the inner edge of the lining 10 and the inner edge of the outer sheathing 11 around the door opening, it is desirable that the molding be nonmetallic. Further, it is also desirable that the molding B be attached without passing screws or nails through the same.

I have provided a self-embedding nail screw 12 which is formed with a dished or concaved disc head 13. The head 13 is thin in formation so that it may act as a self-embedding means to anchor the head 13 in the molding B when the molding is tapped on the outside of the nail head 13 in attaching the molding to the body portion 14 of the refrigerator cabinet A.

Figures 2, 3:
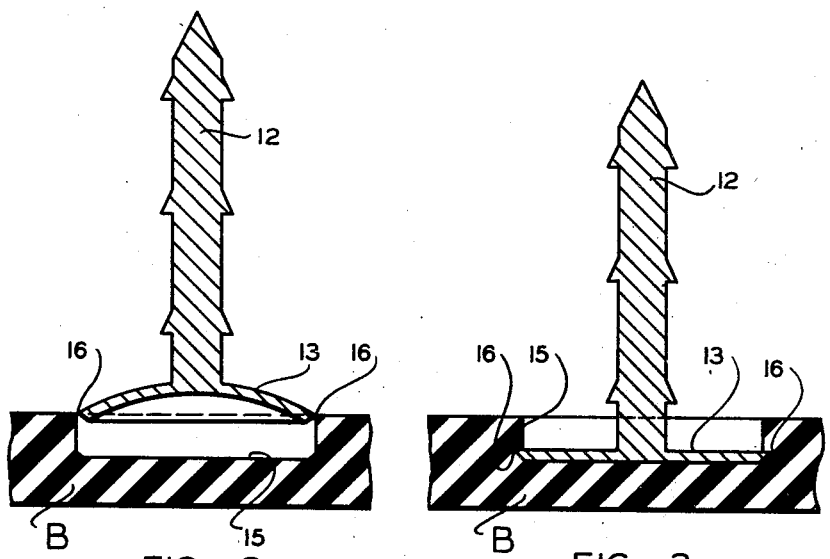

A recess 15 is formed on the inside of the molding B into which the head 13 of the nail screw 12 fits, and as the head 13 reaches the base of the recess 15, and pressure is exerted against the outside smooth surface of the molding B in driving the nail screw 12 into the body 14, the thin head 13 will flatten out, as illustrated in Figure 3, causing the sharp edge 16 to become embedded in the body of the molding B, anchoring the nail head 12 in the molding.

The molding B may be made of any suitable material which is soft enough to receive the head of the nail screw 13, and a series of nails 12 may be used, placed at intervals in the recesses 15 so that the molding B may be held firmly in place.

When the nails 12 have been driven into the body 14 of the refrigerator or cabinet A, they act as anchoring means for holding the molding B firmly in place and without being marred by screws or nails passing through the same, thereby providing a neat finishing molding for door openings of refrigerators and other cabinets where it is desirable to use a finishing molding which is to be anchored in place.

Even if the molding B is made of softer material, like a composition of rubber or other similar material, the nail or nail screw may act as a self-embedding anchoring means to hold the molding B in place. Where the molding B is of a soft material like molded rubber, it could be removed from the nail head 13 after the same is flattened out by stretching the material of the molding over the enlarged flattened head 13, should it be desirable to remove it.

In finishing refrigerators or enameled cabinets, that is where the outer surface of the cabinet or refrigerator is covered with an enameled sheathing and the same is lined with a similar material, it is desirable to use a fairly hard molding B such as Bakelite or other molded material, so as to provide a smooth, clean finish around the door opening which is largely impervious to moisture and which can be kept clean and neat and without any holes in the material for the anchoring means. This I am able to accomplish with my self-embedding nail screws to provide the method of application of refrigerator moldings with concealed securing means.

In accordance with the patent statutes, I have described the principles of construction and operation of my method of application of refrigerator molding with concealed securing nails; and while I have endeavored to set forth the best embodiments thereof, I desire to have it understood that these are only illustrative of a means of carrying out my invention, and that obvious changes may be made within the scope of the following claim without departing from the spirit of my invention.

I claim:

A self-embedding nail screw comprising an elongated pointed shank, a relatively thin outwardly concaved disc-head portion being of the same thickness throughout its entire area, said concave disc-head having a sharp edge formed by a beveled surface converging in a direction opposite the shank extending around the entire periphery thereof, and said concave disc-head adapted to entirely flatten out when a slight pressure is exerted axially against said shank portion whereby said self-embedding anchoring means may be used in securing a relatively soft finishing molding at a joint.

ENOCH SWEDMAN.